Jan. 21, 1958

E. C. SCHUNKE 2,820,839

THERMOCOUPLE

Filed July 23, 1953

INVENTOR
Edwin C. Schunke
BY
Paul Fitzpatrick
ATTORNEY

United States Patent Office 2,820,839
Patented Jan. 21, 1958

2,820,839

THERMOCOUPLE

Edwin C. Schunke, Speedway, Ind., assignor to General Motors Corporation, Detroit, Mich., a corporation of Delaware Application July 23, 1953, Serial No. 369,856

4 Claims. (Cl. 136—4)

This invention relates to thermocouple probes and more particularly to shielded sampling probes for measuring the temperatures of highly heated, high velocity gases flowing through ducts of relatively lower temperature.

When a thermocouple is placed in a hot, high velocity gas duct such as the inlet or outlet duct of a gas turbine, the E. M. F. produced thereby accurately measures the temperature difference between the hot and cold junctions of the thermocouple but not necessarily the actual temperature of the gas. Heat transfer from the highly heated gas to the hot junction is primarily by convection while heat transfer from the hot junction to the lower temperature duct is by radiation and conduction. Heat transfer to the junction must proceed at the same rate as heat transfer from the junction in order to obtain an accurate indication of the gas temperature. Heat transfer from the junction tends to be excessive unless special precautions are taken in the design of the gas probe.

Heat transfer from the junction by conduction may be reduced by placing the junction as far as possible from the duct wall and/or by exposing most of the thermocouple wire directly to the hot gas stream. This means of reducing conduction heat transfer is impractical in applications where the size of the duct limits the distance that the junction may be placed from the duct wall and/or where the gas stream is of such high velocity that a casing and insulation is required to reinforce the thermocouple wires up to the junction to prevent their bending from the impact of the gas stream. Heat transfer from the junction by radiation may be reduced by providing a reflective shield between the junction and the duct wall. Conventional insulated gas probes are usually designed to have a length to diameter ratio of 10 to 1 to reduce conduction heat transfer from the junction and are shielded in some instances to reduce radiation heat transfer from the junction so that the heat transfer to and from the junction will be in equilibrium, but these probes are unsuitable for measuring the temperature of high velocity gases in small ducts, such as the nozzle inlet duct of a gas turbine, because of their excessive length. Another consideration in gas probe design results from temperature differentials between various gas strata in the duct making some form of sampling desirable to obtain an average gas temperature.

An object of the invention is to provide an insulated and reinforced gas probe of simple and sturdy construction and of minimum length to diameter ratio wherein heat transfer between the junction and an associated gas duct wall will be in substantial balance.

A further object of the invention is to provide such a gas probe with means for averaging the temperatures of various gas strata in a gas duct.

Further objects and advantages of the present invention will be apparent from the following description, reference being had to the accompanying drawings wherein a preferred form of the present invention is clearly shown.

Figure 1:
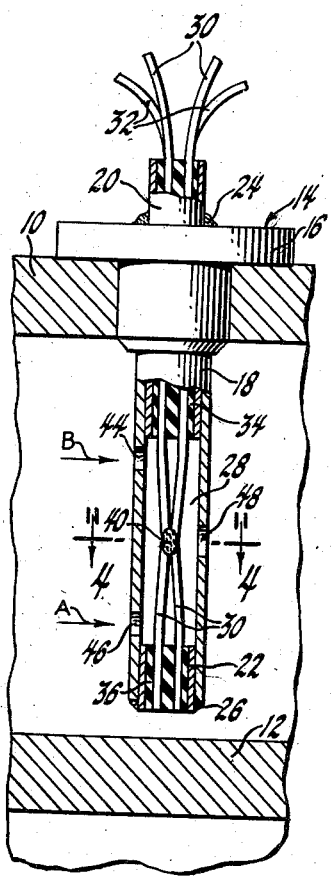
Fig. 1 is a partial longitudinal section through the annular intake duct of a gas turbine or the like showing a partially broken away thermocouple according to the invention mounted therein.

Referring now to the drawings, only so much of the intake duct of the gas turbine is shown as is necessary for an understanding of the invention. The duct comprises a cylindrical outer wall 10 and a cylindrical inner wall 12 forming an annular passage for the flow of highly heated, high velocity gas in the axial directions indicated by the arrows A, B and C. The duct walls are exposed on their exterior to cooling air making them of lower temperature than the gases therein.

Figure 4:
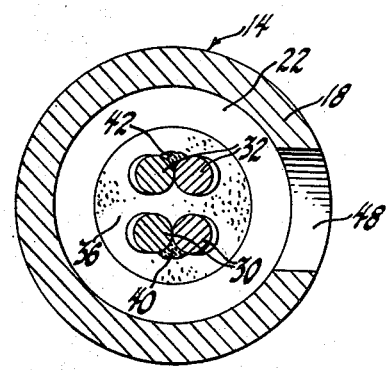
Fig. 4 is a section taken substantially on the plane indicated by the line 4—4 of Fig. 1.

Referring now to Figs. 1 and 4 for the preferred embodiment of the invention, the gas probe 14 is suitably secured to the outer wall 10 by a flange 16 and includes a stainless steel tubular shield 18 which projects radially into the gas passage, that is, normal to the flow of the gas strata A and B. A pair of stainless steel tubes 20 and 22 are secured in spaced relation in the shield 18 by welds 24 and 26 to form an elongated chamber 28 in the shield. Two pairs of Chromel-Alumel thermocouple wires 30 and 32 are supported in the tubes 20 and 22 by magnesium oxide insulation 34 and 36 packed therein. The thermocouple wires 30 are bent together and welded to form a hot thermocouple junction 40 in the center of the chamber 28, a similar welded junction 42 being provided for the thermocouple wires 32. Only one thermocouple wire pair is necessary, the extra thermocouple wire pair being provided in the interest of safety or for transmitting an E. M. F. to a different indicating instrument. Gas inlets 44 and 46 are provided at each end of the chamber 28 to intake gas from the separated strata indicated by the arrows A and B pass the gas over the exposed substantial length of thermocouple wires and the junctions for subsequent discharge out a diametrically opposed central outlet 48. The shield 18 and the insulators 34 and 36 provide support for the thermocouple wires at each end of the chamber 28 to reinforce them from bending under the impact of the gas flow through the chamber thereby permitting a substantial length of thermocouple wire to be exposed in the chamber so that conduction heat transfer from the junctions to the duct wall 10 is reduced. This results in an accurate insulated gas probe having a smaller length to diameter ratio than those previously known. The shield 18 reduces radiation heat transfer from the junctions to the duct wall 10 and the spaced inlets 44 and 46 and central outlet 48 provide gas from the separated strata A and B to the centrally located junctions so that an average temperature of the gas in the duct is obtained.

Figure 2:
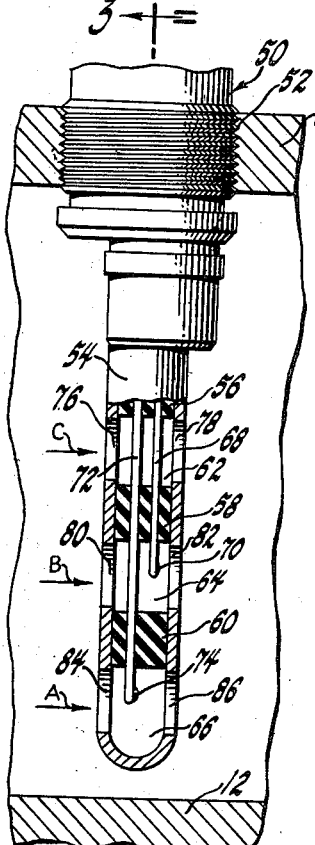
Fig. 2 is a partial longitudinal section through the annular intake duct of a gas turbine or the like showing a partially broken away thermocouple according to a different embodiment of the invention mounted therein.
Figure 3:
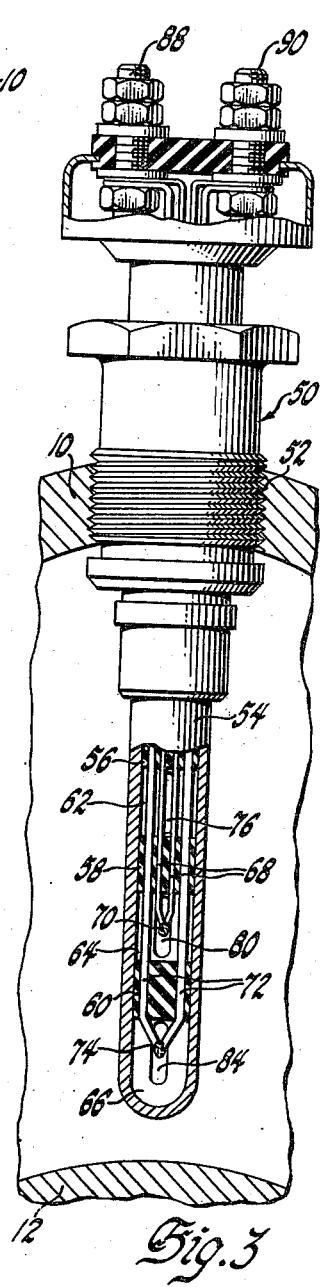
Fig. 3 is a section taken substantially on the plane indicated by the line 3—3 of Fig. 2.

Referring now to Figs. 2 and 3 for the other embodiment of the invention, the gas probe 50 is threaded through the outer duct wall 10 at 52 to project normal to the flow of the gas strata A, B and C in the duct. The thermocouple 50 includes a stainless steel tubular shield 54 having magnesium oxide insulators 56, 58 and 60 packed therein and spaced from each other to form chambers 62, 64 and 66 at increasing distance from the wall 10. A first pair of Chromel-Alumel thermocouple wires 68 are supported in the shield 54 by the insulators 56 and 58 and extend exposed through the chamber 62 and into the chamber 64 where a weld 70 provides their hot junction. A second pair of Chromel-Alumel thermocouple wires 72 are supported in the shield 54 by the insulators 56, 58 and 60 and extend exposed through the chambers 62 and 64 and into the chamber 66 for hot junction joinder by a weld 74. The chambers 62, 64 and 66 are provided with diametrically opposed inlet and outlet openings 76 and 78, 80 and 82, and 84 and 86 for the flow of gas from the respective stratas C, B and A through the chambers. The flow of gas through the chamber 62 over the exposed substantial length of thermocouple wire therein reduces conduction heat transfer from the junctions 70 and 74 to the wall 10 while the shield 54 and the respective insulators 58 and 60 beyond the exposed length of thermocouple wire reinforce the same against bending by the impact of the gas flow through the chamber. Radiation heat transfer from the junctions to the wall 10 is reduced by the shield 54. The like leads of each thermocouple pair 68 and 72 are connected together in parallel at the junction posts 88 and 90 and the pairs are of different diameter so that each has the same resistance despite their length discrepancy. Because of this, the E. M. F. between the posts 88 and 90 will indicate the average temperature of the gas from the separated strata A and B through the chambers 66 and 64.

It should be apparent that both embodiments of the invention permit a substantial length of thermocouple wire to be exposed to high velocity gas flow, thereby reducing conduction heat transfer to the wall and yet provide ample support for the thermocouple wires. Both embodiments also provide shielded junctions to reduce radiation heat transfer to the wall and sample separated gas strata to achieve an average gas temperature indication.

While the preferred embodiment of the invention has been described fully in order to explain the principles of the invention, it is to be understood that modifications in structure may be made by the exercise of skill in the art within the scope of the invention, which is not to be regarded as limited by the detailed description of the preferred embodiment.

I claim:

1. A temperature probe for gases comprising a casing, insulators in the casing spaced from each other to form a chamber therein, and a spaced pair of thermocouple wires in the chamber being free of contact with the casing and having a junction with each other located between the insulators, each wire extending the full length of the chamber and being supported at each end of the chamber by the insulators, the casing having inlet and outlet openings for gas flow through the chamber.

2. A temperature probe for gases comprising a casing, insulators in the casing spaced from each other to form a chamber therein, and a spaced pair of thermocouple wires in the chamber being free of contact with the casing and having a junction with each other located centrally in the chamber, each wire extending the full length of the chamber and being supported at each end of the chamber by the insulators, the casing having an inlet opening at each end of the chamber for gas flow through the chamber and an outlet opening at the center of the chamber.

3. A gas probe comprising a shield adapted to be supported by a gas duct wall, the gas in the duct having a different temperature than that of the duct wall, insulators in the shield spaced from each other to form a chamber therein, and a spaced pair of thermocouple wires in the chamber being free of contact with the shield and having a junction with each other between the insulators, each wire being supported at each end of the chamber by the insulators, the shield being effective to reduce radiation heat transfer between the wall and junction, the thermocouple wires being exposed over that portion of their length in the chamber, the shield having an inlet opening at each end of the chamber and an opposed outlet opening at the center of the chamber for the flow of gas through the shield and across the junction and exposed portion of wire length, the flow of gas across the exposed portion of wire length being effective to reduce conduction heat transfer between the wall and junction.

4. A gas probe comprising a metallic tube adapted to be supported by a duct wall normal to the flow of a gas in the duct at a different temperature than that of the duct wall, insulators in the tube spaced from each other to form an elongated chamber therein, and a spaced pair of thermocouple wires in the chamber being free of contact with the tube and having a junction with each other located centrally therein, each wire being supported at each end of the chamber by the insulators, the tube being effective to reduce radiation heat transfer between the wall and junction, the thermocouple wires being exposed over that portion of their length in the chamber, the tube having an inlet opening facing upstream at each end of the chamber and a diametrically opposed outlet opening at the center of the tube for the flow of gas from different strata through the tube and across the junction and exposed portion of wire length, the tube openings and chamber being effective to obtain an average gas temperature, the flow of gas across the exposed portion of wire length being effective to reduce conduction heat transfer between the wall and junction, the tube and insulators being effective to reinforce the thermocouples wire against bending by the impact of the gas flow.

References Cited in the file of this patent

UNITED STATES PATENTS

| | | |
|---|---|---|
| 1,526,641 | Mulvany et al. | Feb. 17, 1925 |
| 2,246,563 | Winters | June 24, 1941 |
| 2,314,877 | Hall | Mar. 30, 1943 |
| 2,410,218 | Kelly | Oct. 29, 1946 |
| 2,485,468 | Wrigley | Oct. 18, 1949 |
| 2,496,806 | Moffatt | Feb. 7, 1950 |
| 2,496,835 | Ward | Feb. 7, 1950 |
| 2,652,723 | Hastings | Sept. 22, 1953 |
| 2,653,983 | Best | Sept. 29, 1953 |

FOREIGN PATENTS

| | | |
|---|---|---|
| 461,370 | Great Britain | Feb. 16, 1937 |